US008068840B2

(12) United States Patent
Patel et al.

(10) Patent No.: US 8,068,840 B2
(45) Date of Patent: Nov. 29, 2011

(54) METHODS AND APPARATUS FOR ACHIEVING ROUTE OPTIMIZATION AND LOCATION PRIVACY IN AN IPV6 NETWORK

(75) Inventors: Alpesh Patel, Pleasanton, CA (US); Kent Leung, Mountain View, CA (US); Gopal Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/900,353

(22) Filed: Oct. 7, 2010

(65) Prior Publication Data

US 2011/0026488 A1    Feb. 3, 2011

Related U.S. Application Data

(63) Continuation of application No. 10/898,579, filed on Jul. 23, 2004, now Pat. No. 7,840,217.

(51) Int. Cl.
*H04Q 7/20* (2006.01)

(52) U.S. Cl. ............ 455/439; 455/432.1; 455/436; 455/432.2; 455/437; 370/331; 370/328; 370/338; 370/400

(58) Field of Classification Search .......... 455/439, 455/432.1, 435.1, 432.2, 436, 438
See application file for complete search history.

(56) References Cited

U.S. PATENT DOCUMENTS

| 6,466,964 | B1 | 10/2002 | Leung et al. |
| 6,636,498 | B1 | 10/2003 | Leung |
| 7,840,217 | B2 | 11/2010 | Patel et al. |
| 2001/0046223 | A1 | 11/2001 | Malki et al. |
| 2004/0105408 | A1 | 6/2004 | Suh et al. |
| 2004/0114558 | A1 | 6/2004 | Krishnamurthi et al. |

OTHER PUBLICATIONS

C. Finseth, "An Access Control Protocol, Sometimes Called TACACS," RFC 1492, Jul. 1993, 15 pages.
C. Perkins, "IP Mobility Support," RFC 2002, Oct. 1996, 73 pages.
C. Rigney, et al, "Remote Authentication Dial in User Service (RADIUS)," RFC 2138, Apr. 1997, 65 pages.
B. Aboba, et al, "The Network Access Identifier," RFC 2486, Jan. 1999, 6 pages.
P. Calhoun, et al, "Diameter Base Protocol," RFC 3588, Sep. 2003, 114 pages.

(Continued)

*Primary Examiner* — Charles Appiah
*Assistant Examiner* — Randy Peaches
(74) *Attorney, Agent, or Firm* — Weaver Austin Villeneuve & Sampson LLP

(57) ABSTRACT

Methods and apparatus for performing proxy registration on behalf of a node with a Home Agent supporting Mobile IP are disclosed. A first registration request is composed on behalf of the node and transmitted to the Home Agent via a first Local Mobility Anchor, wherein the first Local Mobility Anchor is a regional controller via which registration is performed when the node moves within a region associated with the first Local Mobility Anchor. When the node moves within a region or between regions, the node is re-registered. Specifically, a second registration request is composed and transmitted to the first Local Mobility Anchor when the node moves within the region associated with the first Local Mobility Anchor. When the node moves into a second region associated with a second Local Mobility Anchor and outside the first region associated with the first Local Mobility Anchor, a second registration request is composed and transmitted to the Home Agent via the second Local Mobility Anchor, wherein the second Local Mobility Anchor is a regional controller via which registration is performed when the node moves within a region associated with second first Local Mobility Anchor.

34 Claims, 9 Drawing Sheets

OTHER PUBLICATIONS

D. Johnson, et al, "Mobility Support in IPv6," RFC 3775, Jun. 2004, 129 pages.

J. Arkko, et al, "Using IPsec to Protect Mobile IPv6 Signaling Between Mobile Nodes and Home Agents," RFC 3776, Jun. 2004, 32 pages.

A. Patel, et al, "Methods and Apparatus for Implementing Mobile IPv6 Route Optimization Enhancements," U.S. Appl. No. 11/129,265, filed May 12, 2005.

A. Patel, et al, "Methods and Apparatus for Achieving Route Optimization Between Mobile Networks and a Correspondent Node Using a Mobile Router As a Proxy Node," U.S. Appl. No. 10/874,650, filed Jun. 22, 2004.

Application No. PCT/US2005/026031, International Search Report, dated Dec. 1, 2005.

Application No. PCT/US2005/026031, Written Opinion of International Searching Authority, dated Dec. 1, 2005.

Soliman, H., et al.: Hierarchical MIPv6 mobility management (HMIPv6), IETF Mobile IP Working Group Internet Draft, Jul. 2002. XP-002253178.

Gustafsson, E., et al.: Mobile IPv4 Regional Registration, Mobile IP Working Group Internet Draft, Oct. 22, 2002.

European Office Action dated Jun. 6, 2007 from corresponding EP Application No. 05 778 136.1, 8 pgs.

European Office Action dated Mar. 11, 2008 in corresponding EP Application No. 05778136.1-2413, 4 pgs.

European Office Action dated Jan. 23, 2008 in corresponding EP Application No. 05778136.1-2413, 4 pgs.

First Chinese Office Action dated May 8, 2009 from Application No. 200580024922.5; 43 pgs.

CN Office Action dated Nov. 18, 2010 from CN Appl. No. 200580024922.5.

US Non-Final Office Action dated Sep. 25, 2008, from U.S. Appl. No. 10/898,579.

US Final Office Action dated May 22, 2009, from U.S. Appl. No. 10/898,579.

US Non-Final Office Action dated Dec. 10, 2009, from U.S. Appl. No. 10/898,579.

Notice of Allowance dated Mar. 10, 2010, from U.S. Appl. No. 10/898,579.

CA Office Action dated Feb. 16, 2010, from CA Appl. No. 2,572,978.

METHODS AND APPARATUS FOR ACHIEVING ROUTE OPTIMIZATION AND LOCATION PRIVACY IN AN IPV6 NETWORK

RELATED APPLICATIONS

This application is a continuation and claims priority from U.S. patent application Ser. No. 10/898,579, entitled "Methods and Apparatus for Achieving Route Optimization and Location Privacy in an IPv6 Network," filed on Jul. 23, 2004, by Patel et al, which is incorporated herein by reference and for all purposes.

BACKGROUND OF THE INVENTION

The present invention relates to Mobile IP network technology. More specifically, this invention relates to mechanisms for achieving route optimization in a Mobile IP environment while maintaining location privacy.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. One implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment as implemented in Mobile Ipv4 are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to Corresponding Node 18 (as indicated by the dotted line "packet from MN") according to a standard internet protocol. If Corresponding Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Corresponding Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

RFC 3775, entitled "Mobility Support in IPv6," published in June, 2004, by D. Johnson et al discloses a protocol which allows nodes to remain reachable while roaming in IPv6. This RFC defines the entities of Home Agent (HA), Mobile Node (MN) and Correspondent Node (CN), and describes the Mobile IP registration process with reference to an IPv6 environment. This draft is incorporated herein by reference for all purposes.

In order to optimize the route via which packets are routed from the Correspondent to the Mobile Node, it is desirable to enable the Corresponding Node to communicate directly with the Mobile Node. This is generally accomplished in two different ways, as set forth in RFC3775 "Mobility Support in IPv6." First, a tunnel between the Corresponding Node and the Mobile Node may be established by the Corresponding Node. Second, the Mobile Node may send a Binding Update message to the Corresponding Node to enable the Corresponding Node to send packets directly to the Mobile Node.

As described above, RFC3775 "Mobility Support in IPv6," specifies a method for performing route optimization between a Mobile Node and a Correspondent Node. During the disclosed route optimization process, the Mobile Node provides its care-of address (i.e., location on the foreign network) to the Correspondent Node via a Binding Update message. In contrast to the registration process that is performed via a Foreign Agent in Mobile Ipv4, registration is performed via a co-located care-of address of the Mobile Node in Mobile IPv6. In other words, the care-of address is associated with the Mobile Node rather than a separate entity. This enables the Correspondent Node to send data packets directly to the Mobile Node without routing traffic to the Home Agent. While this is desirable for route optimization, this method does not preserve location privacy of the Mobile Node.

Generally, a Service Provider attempts to provide optimum service to its customers. As a result, route optimization is a desirable feature, enabling data traffic to be transmitted in an efficient manner. Thus, eliminating the Home Agent from the traffic route between a Mobile Node and Correspondent Node is desirable. However, disclosing the location of the Mobile Node to the Correspondent Node is considered an unacceptable loss of privacy to their customers.

In view of the above, it would be beneficial if route optimization could be accomplished without sacrificing location privacy. Moreover, it would be beneficial if such an optimization scheme could be applied in a Mobile IPv6 environment, as well as be compatible with other versions of Mobile IP.

SUMMARY OF THE INVENTION

The present invention enables route optimization to be achieved while maintaining location privacy of a node. This is accomplished, in part, through a distributed architecture. In this manner, the care-of address and the location of a node such as a Mobile Node supporting Mobile IP are hidden from a Correspondent Node communicating with the node.

In accordance with one aspect of the invention, registration is performed via a Local Mobility Anchor that functions as a regional controller via which registration is performed when the node moves within a region associated with the Local Mobility Anchor. During the initial registration process, the registration request is forwarded by the Local Mobility Anchor to the Home Agent. A tunnel between the Home Agent and the Local Mobility Anchor is created to enable packets to be forwarded by the Home Agent to the Local Mobility Anchor. In addition, a mobility binding table entry is created such that a binding between the node and a care-of address of the node is generated. A Gateway Router at an edge of a service provider network may thereafter query the Home Agent for the care-of address of the node if it is not in possession of a care-of address of the node.

In accordance with yet another aspect of the invention, registration requests may be composed on behalf of the node via an Access Router. For instance, the Access Router may be a first-hop router. The Access Router and the Local Mobility Anchor may be implemented separately. Alternatively, the Access Router and the Local Mobility Anchor may be implemented in one device. In other words, the Local Mobility Anchor may be a first-hop router.

In accordance with yet another aspect of the invention, when the node moves within the region associated with a Local Mobility Anchor, a second registration request is transmitted to the Local Mobility Anchor for processing. The Local Mobility Anchor authenticates the node using authentication information previously obtained (e.g., from a central server) during initial authentication. It is important to note that the second registration request is not forwarded to the Home Agent. In this manner, optimization is achieved during the registration process. When the Local Mobility Anchor is implemented in the Access Router, registration packets may be forwarded to the Home Agent where the Local Mobility Anchor is not acting as a regional router.

In accordance with yet another aspect of the invention, when the node moves into a second region associated with a second Local Mobility Anchor and outside the first region associated with the first Local Mobility Anchor, a second registration request is sent to the Home Agent via a second Local Mobility Anchor, wherein the second Local Mobility Anchor is a regional controller via which registration is performed when the node moves within a region associated with second first Local Mobility Anchor. In addition, a tunnel between the Home Agent and the second Local Mobility Anchor is created to enable packets to be forwarded by the Home Agent to the second Local Mobility Anchor.

In accordance with yet another aspect of the invention, the first Local Mobility Anchor is notified that the node has moved to the region associated with the second Local Mobility Anchor. This may be accomplished, for example, by the Home Agent. A tunnel between the first Local Mobility Anchor and the second mobility anchor may then be generated, thereby enabling packets in transit to be routed from the first Local Mobility Anchor to the second Local Mobility Anchor.

In accordance with still another aspect of the invention, packets to and from a Correspondent Node are tunneled via a Gateway Router at an edge of a service provider network. Since the node communicating with the Correspondent Node may be communicating with multiple Correspondent Nodes, it is important that the correct tunnel be used to transmit packets from the node to the Correspondent Node. Thus, when packets are sent by the node to the Correspondent Node, the Local Mobility Anchor identifies a bi-directional tunnel between the Local Mobility Anchor and a Gateway Router that corresponds to both the node and the Correspondent Node. Data packets may then be forwarded via the identified bi-directional tunnel between the Local Mobility Anchor and the Gateway Router.

In accordance with still another aspect of the invention, when a Gateway Router at an edge of a service provider network receives a packet from a Correspondent Node addressed to a node, the Gateway Router determines whether it has a care-of address for the node. If not, the Gateway Router transmits a care-of address location request to a Home Agent associated with the node to request a care-of address associated with the node. In response, the Gateway Router receives a care-of address associated with the node and a routing path indicating a Local Mobility Anchor via which packets addressed to the node are to be tunneled. When the node moves between regions to another Local Mobility Anchor, the previous Local Mobility Anchor notifies the Gateway Router that the node has moved to the region associated with the new Local Mobility Anchor. For instance, the notification may be sent to the Gateway Router when the Gateway Router sends a data packet addressed to the node to the previous Local Mobility Anchor. A tunnel between the Gateway Router and the second Local Mobility Anchor is then generated in response to the notification message. Data packets addressed to the node that have already been routed to the first Local Mobility Anchor are routed to the second Local Mobility Anchor via the tunnel between the first Local Mobility Anchor and the second Local Mobility Anchor. Newly received packets addressed to the node are thereafter routed by the Gateway Router to the second Local Mobility Anchor.

In accordance with yet another aspect of the invention, if the Gateway Router does not have a care-of-address for the Mobile Node, it forwards/routes the packets like other packets and sends a care-of address location request message to the LocationMobility Anchor. If the Local Mobility Anchor is aware of the Mobile Node's location, it updates the Gateway Router. The Gateway Router then starts tunneling packets to the address received from the Local Mobility Anchor. Note that this address can be the address of the Home Agent (if the Mobile Node is in dormant mode) or the care-of-address of the Mobile Node (if the Mobile Node is active and anchored at an Access Router).

If the Local Mobility Anchor is not aware of the Mobile Node's location, the Local Mobility Anchor starts the paging for the mobile node. Specifically, when the Local Mobility Anchor receives the care-of address location request message from the Gateway Router, the Local Mobility Anchor sends a paging message to the appropriate Access Router, which wakes up the Mobile Node. The Mobile Node then registers with the Home Agent, and the Home Agent creates a binding entry and host route (e.g., tunnel) to the Mobile Node and notifies the Local Mobility Anchor that the Mobile Node has registered with the Home Agent via the Access Router.

In accordance with another aspect of the invention, the invention pertains to a system operable to perform and/or initiate proxy registration on behalf of a node while achieving route optimization and location privacy. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Unfortunately, some nodes are not configured with Mobile IP software. Since a node may not support Mobile IP, a node that changes its location within a network cannot initiate registration with its Home Agent. In order to overcome the limitation of the lack of Mobile IP client software, proxy Mobile IP support (i.e., proxy registration) may be performed on behalf of the node. When proxy Mobile IP is implemented, registration is performed by a proxy node on behalf of the node.

In accordance with one embodiment, the present invention supports route optimization via proxy registration performed on behalf of a node. The node may support Mobile IP, but need not be Mobile IP enabled. Similarly, the Correspondent Node may be a Mobile Node supporting Mobile IP attached to an Access Router. In the following description, the node is described as a Mobile Node supporting Mobile IP. However, this example is merely illustrative, and the node and Correspondent Node need not be configured with Mobile IP software.

The disclosed embodiments may be applied in an IPv6 network, as well as a Mobile IPv6 environment. In this manner, the benefits of Mobile IPv6 may be extracted. However, it is important to note that the described embodiments may be equally applicable in environments supporting other versions of IP and Mobile IP.

Figure 1:
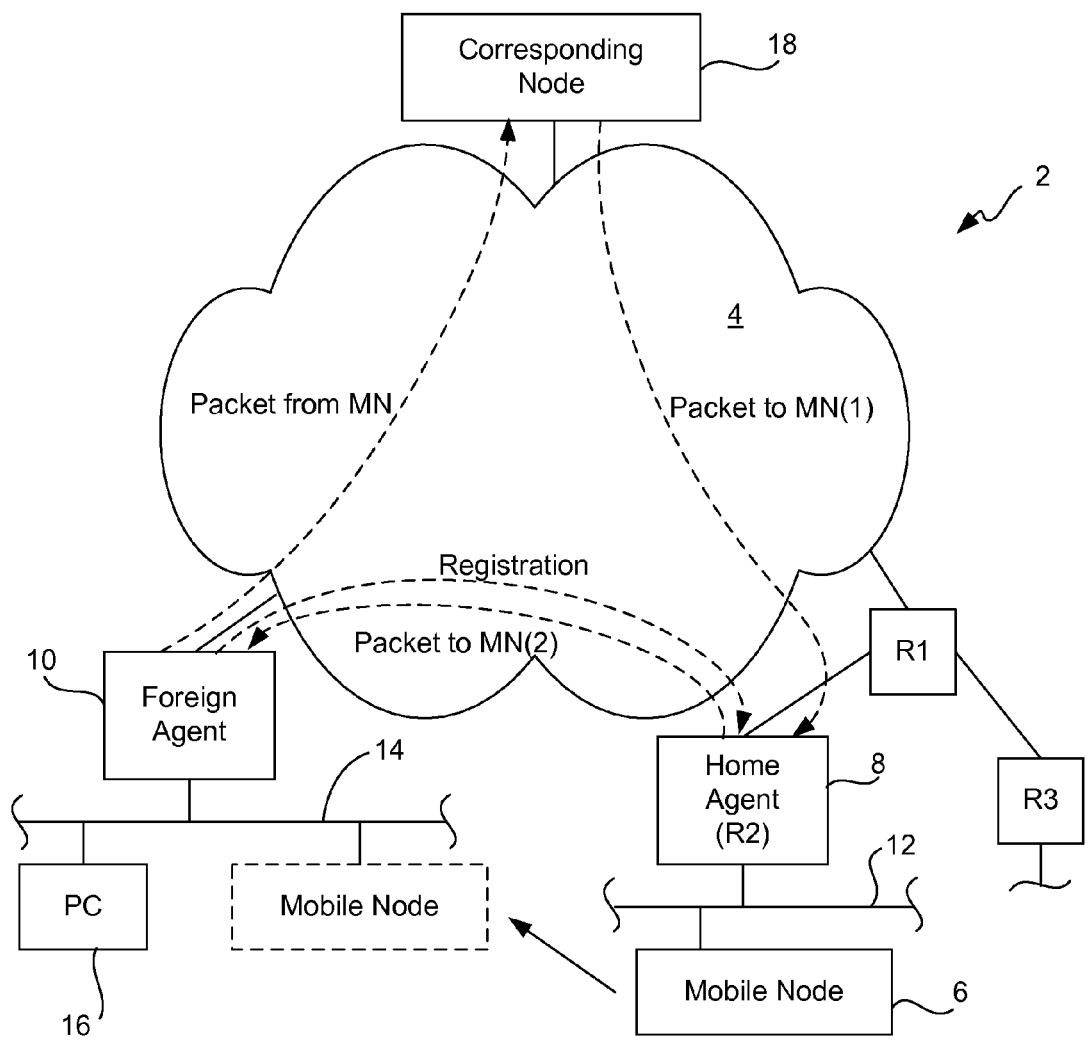
FIG. 1 is a diagram of a Mobile IP network segment and associated environment.
Figure 2:
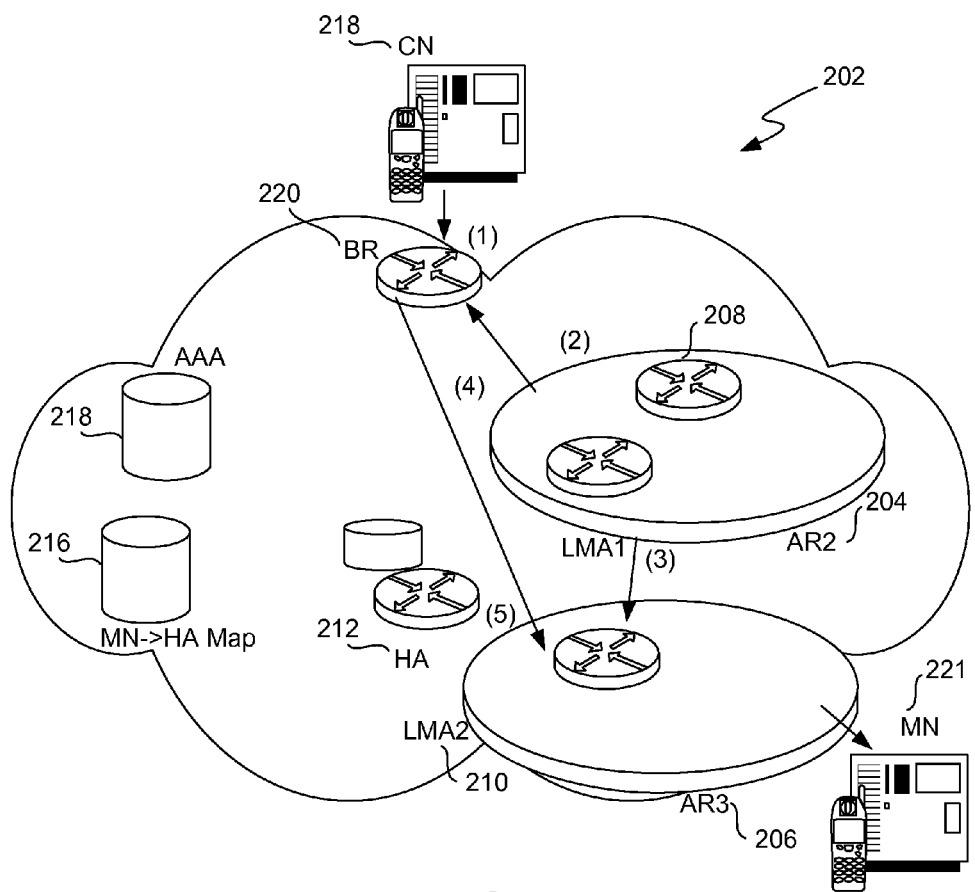
FIG. 2 is a diagram illustrating a system in which the present invention may be implemented.

FIG. 2 is a diagram illustrating a system 202 in which the present invention may be implemented. As shown in FIG. 2, a distributed architecture enables route optimization to be achieved while maintaining location privacy of the node while it roams within a network or between networks. The distributed architecture includes one or more Access Routers (AR), including AR2 204 and AR3 206. In accordance with one embodiment, the Access Routers 204 and 206 are first-hop routers. In addition, one or more Local Mobility Anchors (LMA), LMA1 208 and LMA2 210, are provided. Each Local Mobility Anchor is a regional controller via which registration is performed when the node moves within a region associated with that Local Mobility Anchor. In other words, each Local Mobility Anchor acts as a Home Agent for the node when the node is within the region associated with the Local Mobility Anchor. As a result, the Home Agent 212 is contacted when the node 214 roams between network regions, but the Home Agent 212 need not be contacted when the node 214 (e.g., Mobile Node) moves within a particular network region. In this manner, the registration process is optimized. It is important to note that although the Access Routers and Local Mobility Anchors are illustrated as separate entities, the Access Routers and Local Mobility Anchors may be implemented together such that each Access Router-Local Mobility Anchor combination is implemented in a single network device (e.g., router).

In the initial registration process, a Home Agent 212 may be assigned to the Mobile Node 214 such that a Mobile Node—Home Agent mapping 216 is established. Initial authentication of the Mobile Node may be achieved via a central server such as a AAA server 218. The AAA server 218 may then provide the relevant authentication information to the Home Agent 212 to enable the Home Agent 212 to authenticate the Mobile Node. The Home Agent 212 may then provide information to the Local Mobility Anchor to enable the Local Mobility Anchor to authenticate the Mobile Node 214 as it roams within the region associated with the Local Mobility Anchor.

In accordance with one embodiment, the centralized server provides authentication services and/or authorization services. While authentication determines "who" an entity is, authorization determines what services a user is allowed to perform, or access. Thus, a class of servers known as "AAA" or triple-A servers may be employed. The AAA represents authentication, authorization, and accounting. Various protocols such as the Remote Authentication Dial In User Service (RADIUS), TACACS+, and Diameter may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. RFC 3588 describes the Diameter Base Protocol. Each of these documents is incorporated herein by reference for all purposes.

When the Mobile Node 214 roams within a single network region associated with a Local Mobility Anchor, registration is performed via the Local Mobility Anchor. However, when the Mobile Node 214 roams between Access Routers in two different network regions associated with two different Local Mobility Anchors, the Home Agent is updated such that it is aware of the new Local Mobility Anchor. In addition, the relevant Local Mobility Anchors are notified such that the new Local Mobility Anchor receives the relevant authentication information and the previous Local Mobility Anchor knows to forward traffic already in transit to the new Local Mobility Anchor.

A Correspondent Node 218 connects to the Service Provider Network via a Gateway Router (BR) 220 at an edge of the Service Provider Network. The Gateway Router 220 may be configured with the home subnets of various nodes, which would enable the Gateway Router 220 to ascertain whether a particular node is roaming or in its home network. In addition, the subnet information may enable the Gateway Router 220 to ascertain the Home Agent 212 corresponding to the node (e.g., Mobile Node) 214. In order to communicate with the Mobile Node 214, the Correspondent Node 218 sends packets addressed to the Mobile Node 214 (e.g., at it's home address). It is important to note that the Correspondent Node may be aware of the Mobile Node's home address, but it will not be aware of its care-of address. Rather, upon receiving a data packet addressed to the Mobile Node's home address from the Correspondent Node 218, the Gateway Router 220 will ascertain the location of the Mobile Node 214 (e.g., care-of address) by querying the Home Agent 212 that supports the Mobile Node having the specified home address. Therefore, the Gateway Router 220 will receive the location (e.g., care-of address) of the Mobile Node while protecting the care-of address and therefore the network location of the Mobile Node from the Correspondent Node 218. In addition, the Gateway Router 220 will be informed of the routing path (e.g., Local Mobility Anchor address), thereby enabling the Gateway Router 220 to route packets from the Correspondent Node 218 to the Mobile Node 214. Therefore, the Mobile Node 214 and the Correspondent Node 214 remain unaware of the route optimization.

Figure 3:
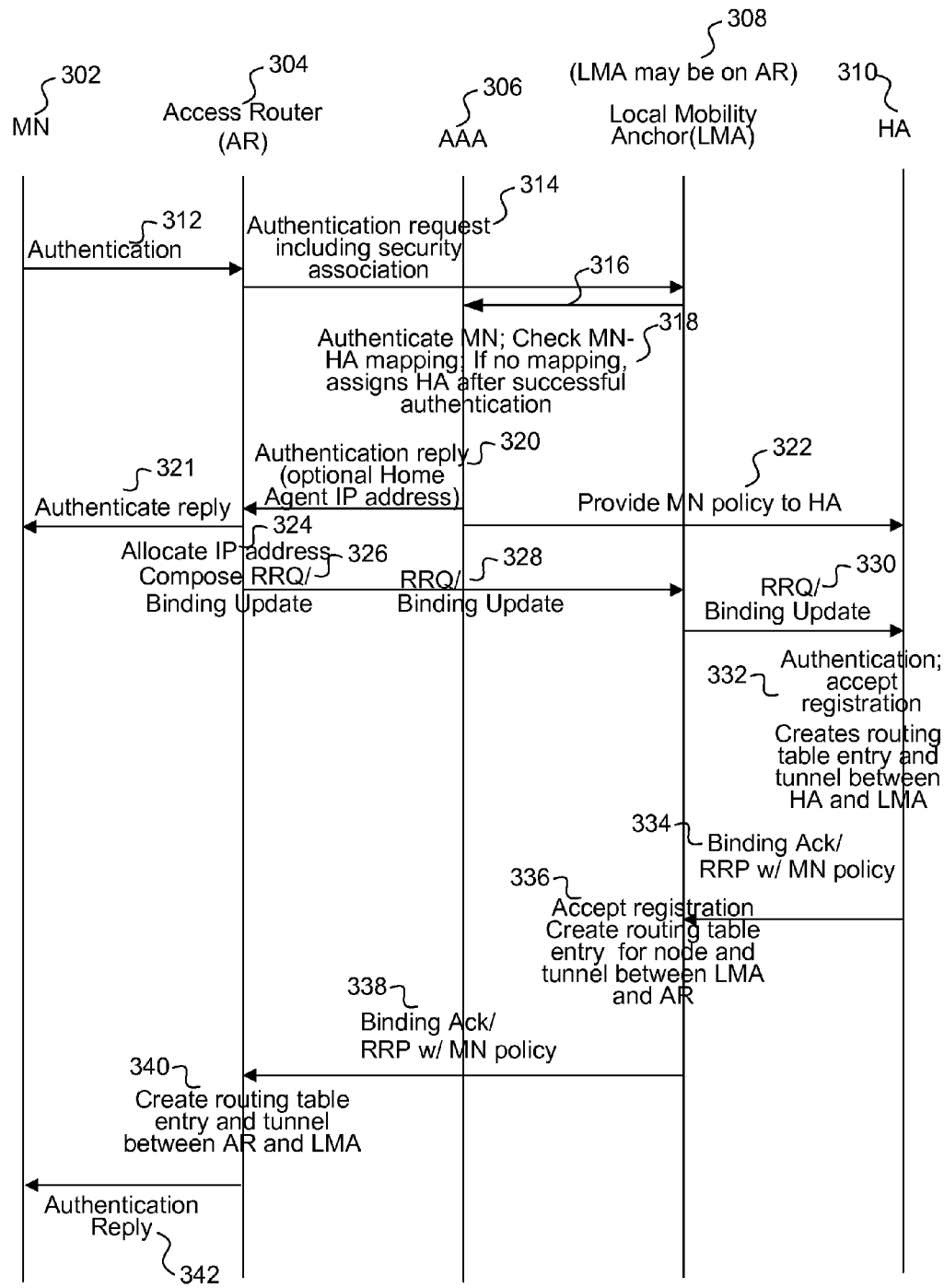
FIG. 3 is a transaction flow diagram illustrating a method of performing proxy registration on behalf of a node in accordance with one embodiment of the invention.

FIG. 3 is a transaction flow diagram illustrating a method of performing proxy registration on behalf of a node in accordance with one embodiment of the invention. Processes performed by the node (e.g., Mobile Node) 302, Access Router 304, AAA server 306, Local Mobility Anchor 308, and Home Agent 310 are represented by corresponding vertical lines, as shown. In this example, the session is authenticated at 312. For instance, authentication may include providing a security association and session credentials (e.g., username and password) during Point to Point Protocol (PPP) authentication.

One standardized method for identifying users is proposed in RFC 2486 of the Network Working Group, January 1999, hereby incorporated by reference, which proposes syntax for the Network Access Identifier (NAI), the userID submitted by a client during Point to Point Protocol (PPP) authentication. Thus, when a client is authenticated based upon the NAI, an IP address may be allocated for use by the client. Thus, in one embodiment, a Network Access Identifier (NAI) extension is used to identify the node.

When the Access Router receives the authentication request, it checks the session credentials (e.g., username and password) and authenticates the node using the security association. However, the Access Router may not have the session credentials and/or security association for the node. Thus, at 314, the Access Router may contact the Local Mobility Anchor to authenticate the session. Since the Local Mobility Anchor may not yet have the session credentials or security association for the node, it may forward the request to a central server such as an AAA server, as shown at 316. In addition, at this time, authentication information (e.g., security association and session credentials) enabling the node to be authenticated may be provided by the AAA server to the Local Mobility Anchor. This enables the Local Mobility Anchor to subsequently authenticate the node as it moves within the region in which it has registered with the Home Agent.

When the AAA server receives the authentication request including the security association at 316, the AAA server authenticates the node using the security association at 318. The AAA server ascertains whether there is a node to Home Agent mapping. If there is no mapping, a Home Agent is assigned to the node. The AAA server then sends an authentication reply at 320 indicating whether authentication was successful to the Access Router. The authentication reply may include a Home Agent address if one was recently assigned to the node. When the Access Router receives the authentication reply, it may then provide the authentication reply at 321 to the node.

In addition, the AAA server provides the policy associated with the node to the Home Agent at 322. The AAA server also provides a key to the Home Agent for use in authenticating the node. The policy may include a variety of information, including IP addresses from which the node can receive communications and/or IP addresses to which the node can send communications. In addition, the policy may indicate those IP addresses to or from which communications cannot be sent or received. The policy may include the type of services available to a node.

Since the node may not have an IP address assigned to it, an IP address may be allocated to the node at 324. For instance, the IP address may be an IPv6 address. A registration request may be composed on behalf of the node, with or without an IP address.

The Access Router composes a registration request (e.g., Binding Update) at 326 including the IP address, and transmits the registration request to the Local Mobility Anchor at 328. When the Local Mobility Anchor receives the registration request, it forwards the registration request to the Home Agent at 330.

When the Home Agent receives the registration request, it authenticates the node using the key previously provided to it at 332. In addition, a bi-directional tunnel between the Home Agent and the Local Mobility Anchor is created, and a routing table entry for the node is generated that indicates that all packets addressed to the node should be routed to the Local Mobility Anchor via the bi-directional tunnel. A mobility binding table entry associates the node with its care-of address. Thereafter, a Gateway Router at an edge of a service provider network may query the Home Agent for the care-of address of the node, as well as routing information.

The Home Agent composes and sends a registration reply (e.g., Binding Acknowledgement) at 334 to the Local Mobility Anchor. The registration reply may include policy associated with the node, as well as a key for use in authenticating the node. Thus, once the Local Mobility Anchor receives the key, it may subsequently authenticate the node when the node roams within the region associated with the Local Mobility Anchor.

When the Local Mobility Anchor receives the registration reply, it stores the key and associated policy. In addition, it creates a tunnel at 336 between the Local Mobility Anchor and the Access Router, and a corresponding routing table entry for the node that routes packets via the tunnel to the Access Router.

The Local Mobility Anchor then sends the registration reply to the Access Router at 338. The registration reply may include the policy associated with the node, enabling the Access Router to filter packets transmitted by or to the node. The Access Router then creates a tunnel between the Access Router and the Local Mobility Anchor at 340.

It is important to note that in the example described above, the user is authenticated prior to performing registration. However, the authentication credentials may be embedded in the registration messages. Accordingly, the authentication may be performed together with the registration, rather than separately as described above. Thus, the authentication reply may be transmitted by the Access Router to the node at 342 after registration has been performed.

Figure 4:
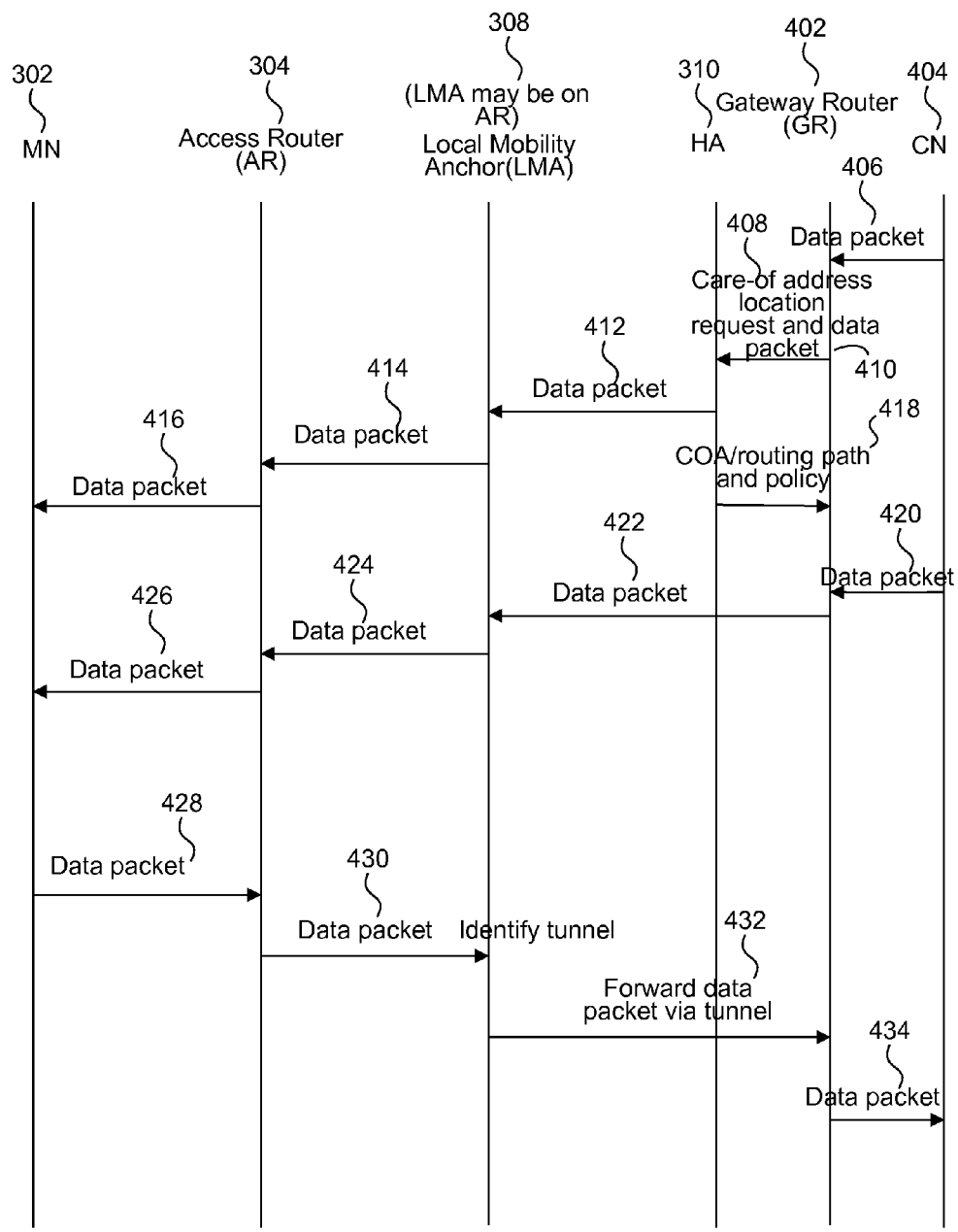
FIG. 4 is a transaction flow diagram illustrating a method of routing traffic between a Correspondent Node and a node in accordance with one embodiment of the invention.

FIG. 4 is a transaction flow diagram illustrating a method of routing traffic between a Correspondent Node and a node in accordance with one embodiment of the invention. Steps performed by a Gateway Router 402 at an edge of a service provider network and a Correspondent Node 404 are represented by vertical lines as shown. When a Correspondent Node 404 sends a data packet addressed to a node to a Gateway Router 402 at 406, the Gateway Router determines whether it has a care-of address for the node. If the Gateway Router does not have a care-of address for the node, the Gateway Router sends a care-of address location request requesting a care-of address associated with the node to the Home Agent at 408. In addition, data packets received by the Gateway Router from the Correspondent Node are forwarded to the Home Agent at 410 until route optimization is established such that data packets may be transmitted directly between the Gateway Router and the Local Mobility Anchor. A data packet received by the Home Agent is then forwarded to the Local Mobility Anchor at 412, followed by the Access Router at 414, thereby preventing the identity of the access router to be discovered by the Correspondent Node. The data packet is then forwarded by the Access Router to the Mobile Node at 416. Thus, data packets received by the Gateway Router are forwarded via the Home Agent until route optimization is established such that data packets may be transmitted directly between the Gateway Router and the Local Mobility Anchor.

When the Home Agent receives a care-of address location request from the Gateway Router requesting a care-of address associated with the node from the Home Agent, the Home Agent provides the care-of address at 418 and a routing path identifying the Local Mobility Anchor to the Gateway Router, thereby enabling the Gateway Router to forward data packets addressed to the node and received from the Correspondent Node to the Local Mobility Anchor. In some embodiments implemented in other versions of IP, the care-of address may identify the Local Mobility Anchor or a first-hop router (e.g., Access Router) rather than the node. From this information, a bi-directional tunnel between the Gateway Router and the Local Mobility Anchor may be established. In addition, policy associated with the node may be provided by the Home Agent to the Gateway Router, thereby enabling the Gateway Router to apply the policy to filter packets transmitted to the node by the Correspondent Node or transmitted by the node to the Correspondent Node.

Once the Gateway Router has received the care-of address and routing path, route optimization may be achieved by eliminating the Home Agent from the data path. As shown, when a data packet addressed to the node is received by the Gateway Router at 420, the Gateway Router tunnels the data packet to the Local Mobility Anchor at 422. The Local Mobility Anchor then tunnels the data packet to the Access Router at 424, thereby preventing the identity of the access router from being discovered by the Correspondent Node. The data packet is then forwarded by the Access Router to the node at 426.

It is important to note that the Home Agent is eliminated from the data path as a result of route optimization. However, when data packets are transmitted to the node when no route optimization is performed, data packets continue to be forwarded to the Home Agent. The Home Agent then routes packets to the node at its care-of address in accordance with conventional processes.

Similarly, route optimization is performed when a node transmits packets to the Correspondent Node. Specifically, packets are reverse tunneled to the Access Router at 428. The Access Router then tunnels the packets to the Local Mobility Anchor at 430. When the Local Mobility Anchor receives a data packet from the node directed to a Correspondent Node, it needs to identify the appropriate tunnel via which to tunnel the data packet to the Correspondent Node. In other words, the node may be communicating with multiple Correspondent Nodes. As a result, the correct tunnel needs to be identified. The Local Mobility Anchor therefore identifies a bi-directional tunnel between the Local Mobility Anchor and a Gateway Router, where the bi-directional tunnel is associated with both the node and the Correspondent Node. The Local Mobility Anchor then forwards the data packet via the appropriate bi-directional tunnel between the Local Mobility Anchor and the Gateway Router at 432. The Gateway Router then sends the data packet at 434 to the Correspondent Node. In this manner, route optimization is achieved by eliminating the Home Agent from the data path.

Figure 5:
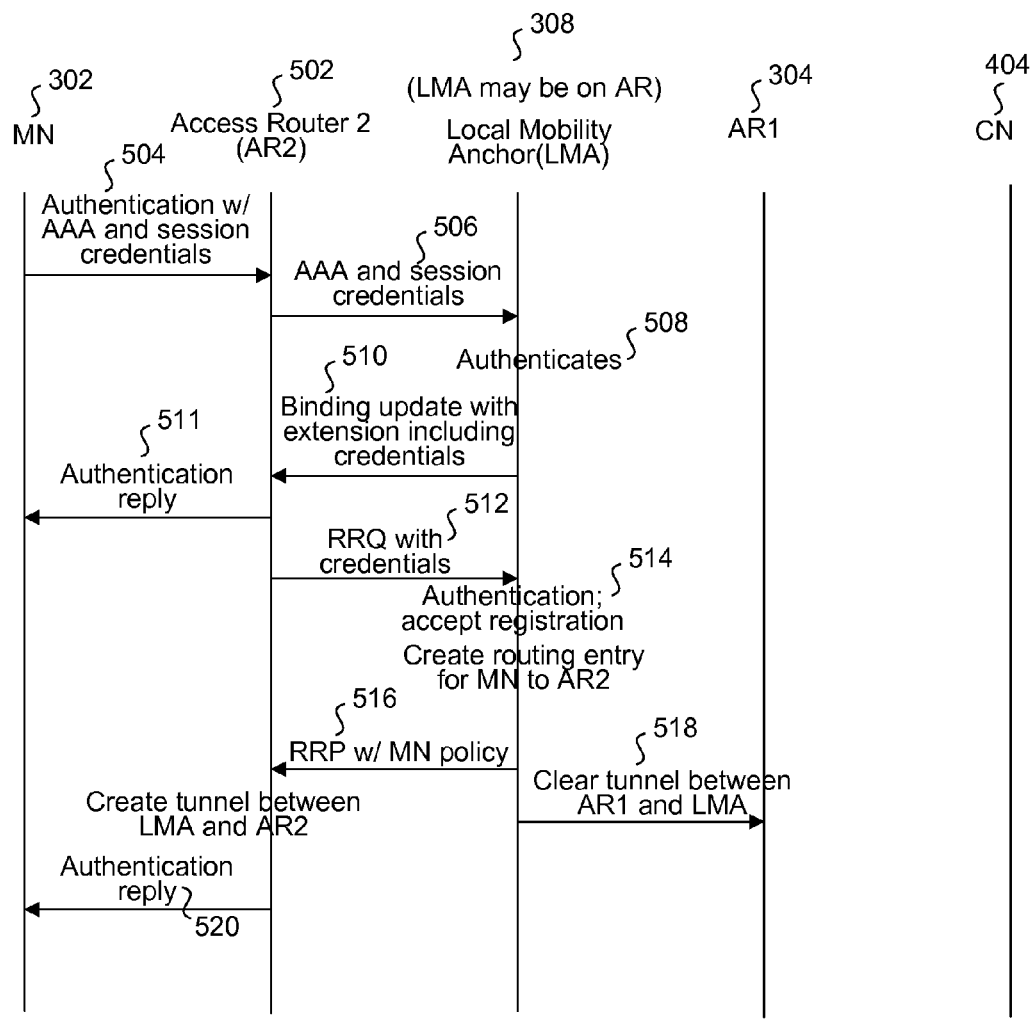
FIG. 5 is a transaction flow diagram illustrating a method of performing proxy registration of the node when the node moves within a particular region in accordance with one embodiment of the invention.

FIG. 5 is a transaction flow diagram illustrating a method of performing registration of the node when the node roams inside the region associated with the Local Mobility Anchor in accordance with one embodiment of the invention. Processes performed by a second Access Router (AR2) are represented by vertical line 502. As shown at 504, the node authenticates to the second Access Router by submitting its security association and session credentials. For instance, this may be performed during PPP authentication. The second Access Router forwards the session credentials to the Local Mobility Anchor at 506. Since the Local Mobility Anchor has previously obtained the node's security association and session credentials, it can now independently authenticate the node at 508. The Local Mobility Anchor may then notify the second Access Router that the session has been authenticated at 510. An authentication reply may then be transmitted by the second Access Router to the node at 511.

The second Access Router then composes a second registration request on behalf of the node and transmits the registration request that includes the security association to the Local Mobility Anchor at 512. The Local Mobility Anchor processes the registration request to determine whether the node has been successfully authenticated by applying the previously obtained security association. Upon successful authentication, a bi-directional tunnel is established at 514 between the Local Mobility Anchor and the Second Access Router. In addition, a routing table entry is created such that a routing path for the node is associated with the bi-directional tunnel. The Local Mobility Anchor then composes and sends a registration reply at 516 to the Second Access Router, at which time a tunnel from the Second Access Router to the Local Mobility Anchor is created. As shown, the second registration request is not forwarded to the Home Agent. Moreover, it is important to note that the Gateway Router need not be notified when the node moves within a particular region associated with a single Local Mobility Anchor.

Since the node has roamed from the first Access Router, it may be desirable to clear the bi-directional tunnel between the first Access Router and the Local Mobility Anchor at 518. Of course, it is desirable to forward traffic already in transit to the node. This may be accomplished via the tunnel between the first Access Router and the Local Mobility Anchor that has already been established. Alternatively, it may be desirable to generate a transient bi-directional tunnel between the first Access Router and the second Access Router, thereby enabling traffic in transit to be forwarded to the second Access Router by the first Access Router.

In the example described above, the user is authenticated prior to performing registration. However, the authentication credentials may be embedded in the registration messages. Accordingly, the authentication may be performed together with the registration, rather than separately as described above. Thus, the authentication reply may be transmitted by the second Access Router to the node at 520 after registration has been performed.

Figure 6:
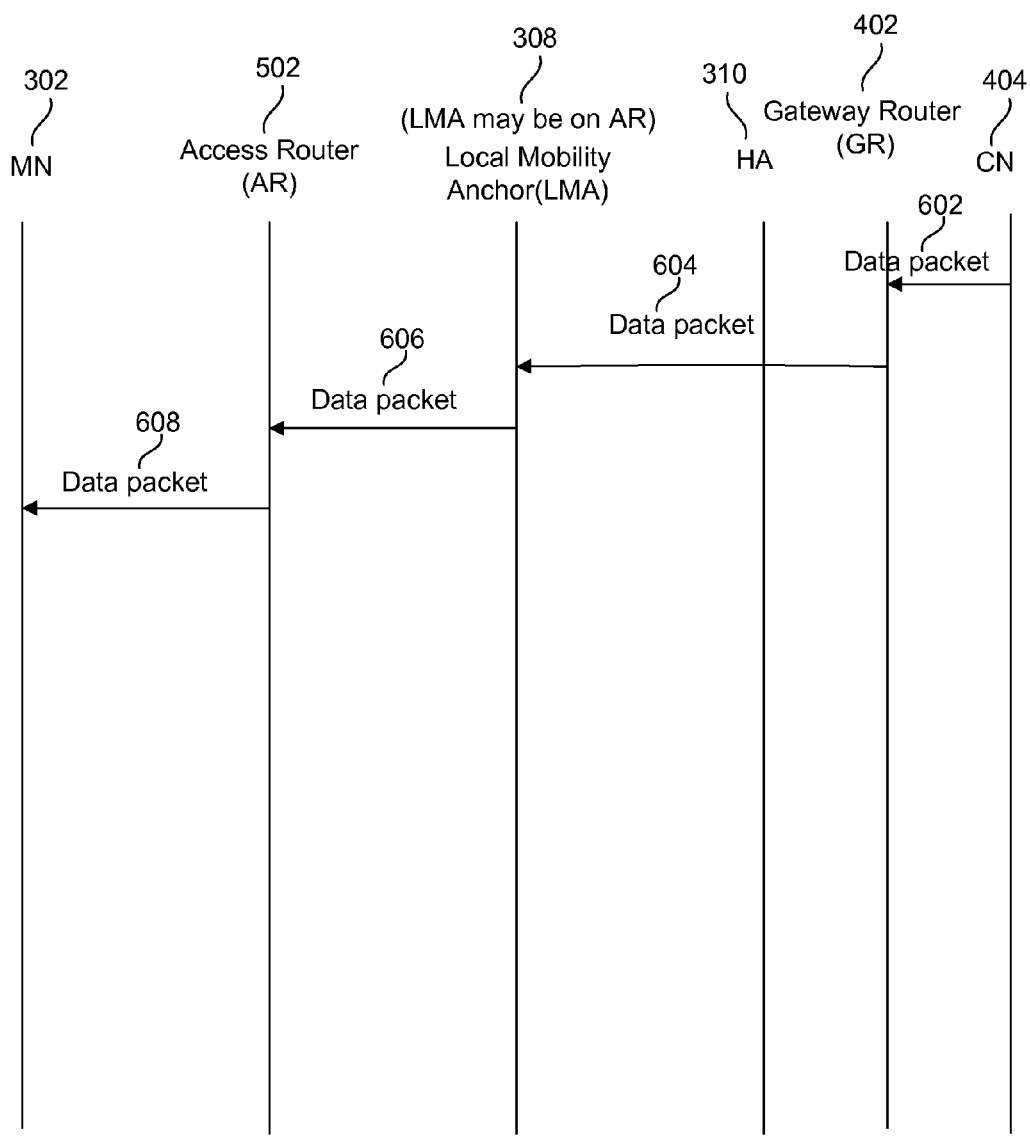
FIG. 6 is a transaction flow diagram illustrating a method of routing traffic from a Correspondent Node to the node after the node moves inside the region in accordance with one embodiment of the invention.

FIG. 6 is a transaction flow diagram illustrating a method of routing traffic from a Correspondent Node to the node after the node moves within the region associated with the Local Mobility Anchor in accordance with one embodiment of the invention. As shown, when a Correspondent Node sends a data packet to the Gateway Router at 602, the Gateway Router forwards the data packet to the Local Mobility Anchor via the bi-directional tunnel between the Local Mobility Anchor and the Gateway Router at 604. Data packets received by the Local Mobility Anchor and addressed to the node are forwarded to the second Access Router at 606 via the tunnel established between the Local Mobility Anchor and the second Access Router. Data packets are then routed by the second Access Router to the node at 608.

Figure 7:
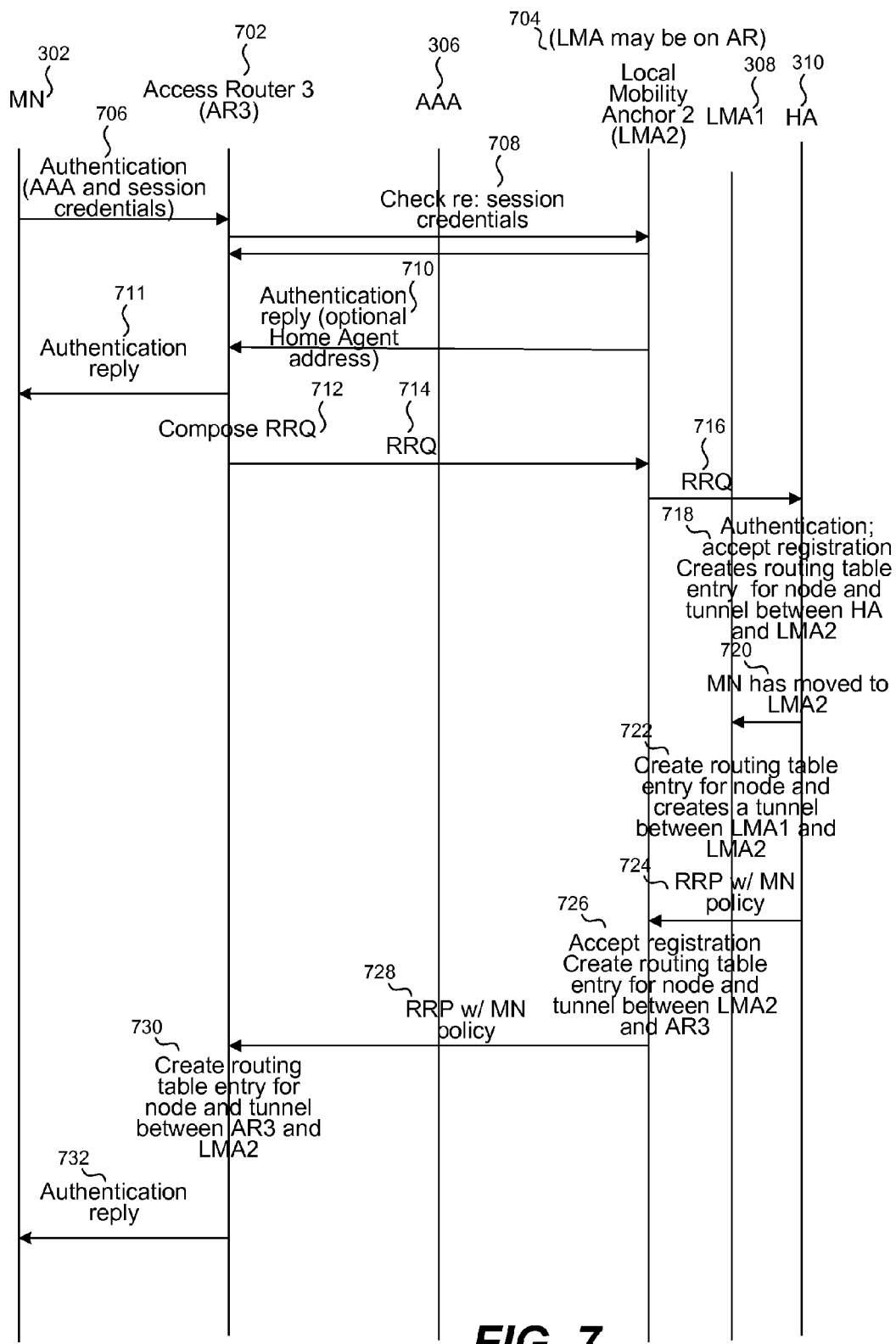
FIG. 7 is a transaction flow diagram illustrating a method of performing proxy registration of the node when the node moves between regions in accordance with one embodiment of the invention.

FIG. 7 is a transaction flow diagram illustrating a method of performing proxy registration of a node when the node moves between regions associated with two different Local Mobility Anchors in accordance with one embodiment of the invention. In this example, the node roams to a third Access Router (AR3) 702 in another region associated with a second Local Mobility Anchor (LMA2) 704. The node authenticates to the third Access Router at 706 by providing its session credentials (e.g., username and password). The third Access Router forwards the session credentials to the second Local Mobility Anchor at 708. At this time, the second Local Mobility Anchor obtains the node's AAA and session credentials, as well as the node's Home Agent mapping. The second Local Mobility Anchor authenticates the node using the session credentials. In order to obtain the session credentials, the Local Mobility Anchor may contact the AAA server. An authentication reply indicating that the node has been authenticated is transmitted by the second Local Mobility Anchor to the third Access Router at 710. This reply packet may also identify the Home Agent address, as well as the security association. An authentication reply may then be transmitted by the third Access Router at 711 to the node.

Once the session has been authenticated, a second registration request is composed on behalf of the node. In accordance with one embodiment, the third Access Router composes a second registration request at 712 including the security association and transmits the second registration request to the Home Agent via a second Local Mobility Anchor at 714 when the node moves into the region associated with the second Local Mobility Anchor and outside the region associated with the first Local Mobility Anchor, where the second Local Mobility Anchor is a regional controller via which registration is performed when the node moves within the region associated with the second Local Mobility Anchor. The second Local Mobility Anchor then forwards the registration request to the Home Agent at 716. The Home Agent authenticates the node using the security association and creates a mobility binding table entry such that a binding between the node and the care-of address is generated. In addition, a routing table entry is created for the node such that a tunnel between the Home Agent and the second Local Mobility Anchor is generated at 718.

The first Local Mobility Anchor is then notified that the node has moved to the region associated with the second Local Mobility Anchor. Specifically, in one embodiment, the Home Agent sends a notification to the first Local Mobility Anchor indicating that the node has moved to the region associated with the second Local Mobility Anchor at 720. Alternatively, the Home Agent can notify the second Local Mobility Anchor so that the second Local Mobility Anchor signals the first Local Mobility Anchor that the node has moved to the region associated with the second Local Mobility Anchor. In order to enable the first Local Mobility Anchor to route packets already in transit to the second Local Mobility Anchor, a tunnel between the first Local Mobility Anchor and the second Local Mobility Anchor is generated at 722 in response to the notification. A routing table entry for the node is then created such that packets addressed to the node are routed via the tunnel.

The Home Agent composes and sends a registration reply at 724 to the second Local Mobility Anchor. The registration reply may include policy associated with the node, thereby enabling the second Local Mobility Anchor to filter packets according to the established policy. The second Local Mobility Anchor accepts the registration at 726, and a bi-directional tunnel between the second Local Mobility Anchor and the third Access Router is generated, thereby enabling packets to be routed by the second Local Mobility Anchor to the third Access Router. A corresponding routing table entry is then created to enable packets addressed to the node to be routed by the second Local Mobility Anchor to the third Access Router. The second Local Mobility Anchor then forwards the registration reply (and associated policy) to the third Access Router at 728. The third Access Router may thereafter apply the policy to filter packets transmitted to and from the node. The third Access Router then creates a routing table entry and associated tunnel between the third Access Router and the second Local Mobility Anchor at 730.

In the example described above, the user is authenticated prior to performing registration. However, the authentication credentials may be embedded in the registration messages. Accordingly, the authentication may be performed together with the registration, rather than separately as described above. Thus, the authentication reply may be transmitted by the third Access Router to the node at 732 after registration has been performed.

Figure 8:
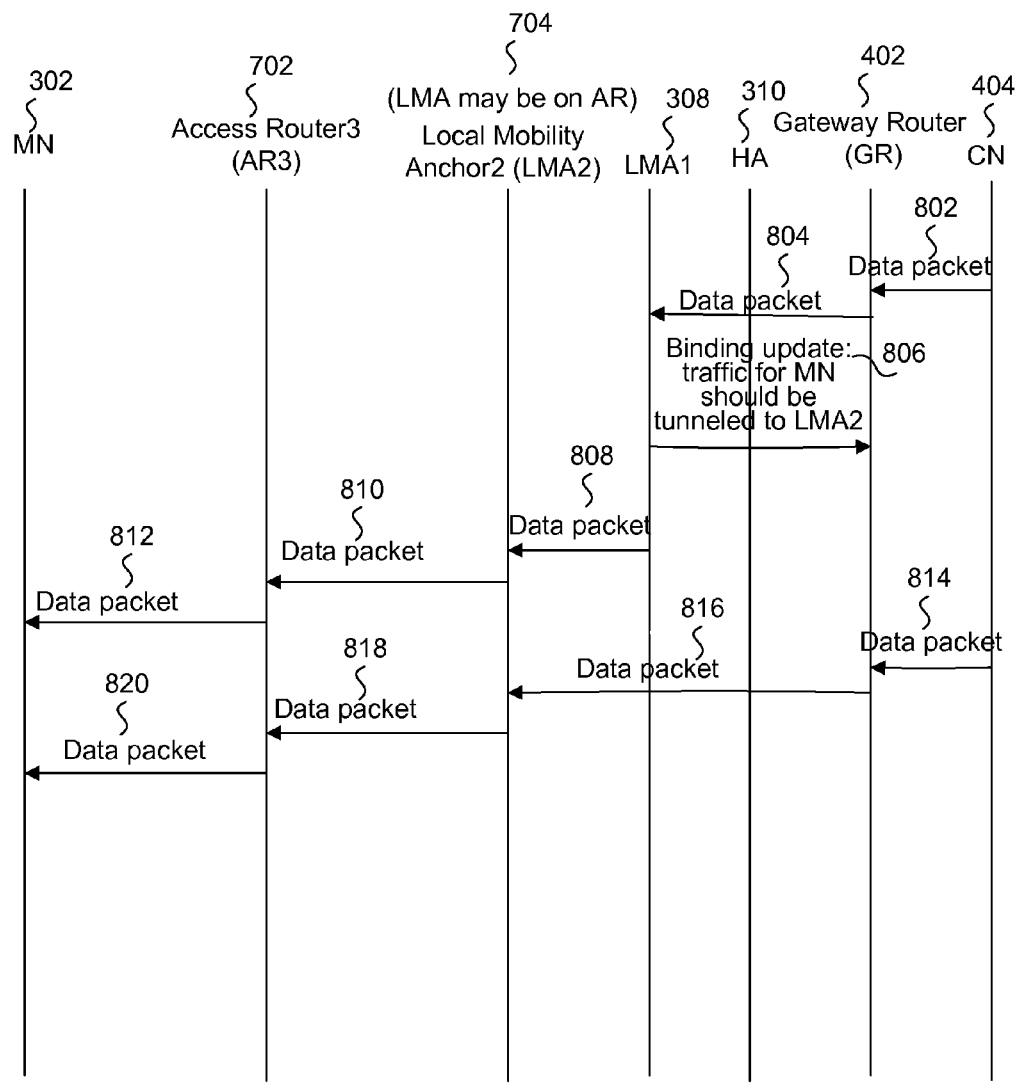
FIG. 8 is a transaction flow diagram illustrating a method of routing traffic from a Correspondent Node to the node after the node moves between regions in accordance with one embodiment of the invention.

FIG. 8 is a transaction flow diagram illustrating a method of routing traffic from a Correspondent Node to the node after the node moves between regions in accordance with one embodiment of the invention. As shown, when a data packet addressed to the node is received by the Gateway Router from the Correspondent Node at 802, data packets that are in transit are forwarded by the Gateway Router to the first Local Mobility Anchor at 804 until route optimization is performed such that the Gateway Router is notified that the node has moved to the region associated with the second Local Mobility Anchor at 806. Specifically, when a data packet addressed to the node is received at the first Local Mobility Anchor from the Gateway Router, the first Local Mobility Anchor notifies the Gateway Router that the node has moved to the region associated with the second Local Mobility Anchor. For instance, this may be accomplished via a Binding Update message that indicates that data packets addressed to the node are to be forwarded to the second Local Mobility Anchor. Alternatively, the first Local Mobility Anchor may simply notify the Gateway Router to clear its routing cache. The Gateway Router will then contact the Home Agent for this routing information (e.g., using a care-of address location request), as described above. A tunnel is then established between the Gateway Router and the second Local Mobility Anchor, and a routing table entry for the node is created by the Gateway Router such that packets are routed via the established tunnel. Packets that are received by the first Local Mobility Anchor are forwarded to the second Local Mobility Anchor at 808 via the transient tunnel previously established. The second Local Mobility Anchor forwards the data packet to the third Access Router at 810, which forwards the data packet to the node at 812.

Once route optimization has been established, data packets received by the Gateway Router at 814 are routed via the second Local Mobility Anchor at 816 using the previously established tunnel between the first Local Mobility Anchor and the second Local Mobility Anchor. Thus, data packets addressed to the node that are subsequently forwarded by the Gateway Router will be routed via the second Local Mobility Anchor, while data packets already in transit will continue to be routed via the first Local Mobility Anchor. In other words, data packets addressed to the node that are already in transit will be routed from the first Local Mobility Anchor to the second Local Mobility Anchor until route optimization has been established such that a bi-directional tunnel between the Gateway Router and the second Local Mobility Anchor is established. Data packets are thereafter forwarded by the second Local Mobility Anchor to the third Access Router at 818. The third Access Router forwards the data packets to the node at 820.

In some cases, the Mobile Node may go into dormant mode. In this case, the Mobile Node is close to being in power-off mode—just the radio is functional. The Mobile Node notifies the Access Router that the Mobile Node is transitioning or has transitioned into dormant mode. This notification includes layer 2 information and possibly layer 3 information such as IP address, NAI, Home Agent address etc.

The Access Router notifies the Mobile Node's Home Agent that the Mobile Node is going into dormant mode or has gone into dormant mode. The Home Agent clears the binding for the Mobile Node and the host route for the Mobile Node (if they are present at the Home Agent). The Home Agent then informs the Local Mobility Anchor about the state of the MN (i.e., that the Mobile Node is in dormant mode or is transitioning into dormant mode) and indicates that this message came from a particular Access Router.

The Local Mobility Anchor updates its internal state to indicate that the Mobile Node is in dormant mode and may also indicate that the Mobile Node is located in the Access Router's paging area (in the event that the Local Mobility Anchor needs to wake up the Mobile Node).

If the Mobile Node moves to another second Access Router while in dormant mode and the second Access Router is in the same paging area as the first Access Router, nothing happens and the Home Agent/Local Mobility Anchor do not need to be notified.

If the Mobile Node moves to another third Access Router, which is in a different paging area, the Mobile Node notifies the third Access Router that it is transitioning or has transitioned into dormant mode. The third Access Router notifies the Home Agent about this state transition (as the first Access Router did initially). The Home Agent does not have any binding/route for the Mobile Node, but notifies the Local Mobility Anchor that the Mobile Node is in dormant mode and located in the region associated with the third Access Router. The Local Mobility Anchor then updates its internal state to include the Mobile Node's location.

Now, a Correspondent Node sends traffic to the MN, which is intercepted by the Gateway Router at the edge of the provider network. The Gateway Router forwards traffic normally and generates a care-of address location query that is transmitted to the Local Mobility Anchor regarding the Mobile Node's location. The Gateway Router may dampen such requests (e.g., transmit them periodically if it is configured to do so and/or transmit these requests only for certain specified Mobile Nodes).

If the Mobile Node is in dormant mode, the packets are forwarded to the Home Agent, which does not have the route for the Mobile Node. The Home Agent temporarily buffers the packets (e.g., forwards the packets to a buffer manager which stores the packets). The Local Mobility Anchor upon receiving the query from the Gateway Router sends a paging message to the third Access Router, which wakes up the Mobile Node. The Mobile Node registers with the Home Agent, and the Home Agent creates a binding entry and host route (e.g., tunnel) to the Mobile Node and notifies the Local Mobility Anchor that the Mobile Node has registered with the Home Agent via the third Access Router.

If the Gateway Router receives the address of the third Access Router from the Local Mobility anchor, the Gateway Router thereafter tunnels packets to the third Access Router. Optionally, since the Mobile Node is in dormant mode, the Local Mobility Anchor just returns the Home Agent address to the Gateway Router. In that case, the Gateway Router starts tunneling packets to the Home Agent on the Gateway Router/HA tunnel (with the Gateway Router address as the source address of the tunnel). These packets may be buffered as indicated above.

When the Mobile Node registers with the Home Agent, the Home Agent forwards the buffered packets to the Mobile Node. The buffered packets, which are tunneled from the Gateway Router to the Home Agent, are detunneled and forwarded (tunneled again) to the Mobile Node. When the packets are detunneled, the Home Agent knows the Gateway Router address and notifies the Gateway Router to forward/tunnel the packets directly to the Mobile Node (if this Mobile Node has route optimization enabled via a policy). In this manner, tunneling from the Gateway Router to the Home Agent lets the Home Agent know who to inform (e.g., the appropriate Gateway Router) for route optimization when the Mobile Node becomes active.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. node, Mobile Node, Home Agent, Gateway Router, Local Mobility Anchor, or Access Router) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents, Gateway Routers, Local Mobility Anchors, or Access Routers of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the proxy registration techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid proxy registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the registration mechanisms of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the proxy registration system may be implemented on a general-purpose network host machine such as a personal computer or workstation. Further, the invention may be at least partially implemented on a card (e.g., an interface card) for a network device or a general-purpose computing device.

Figure 9:
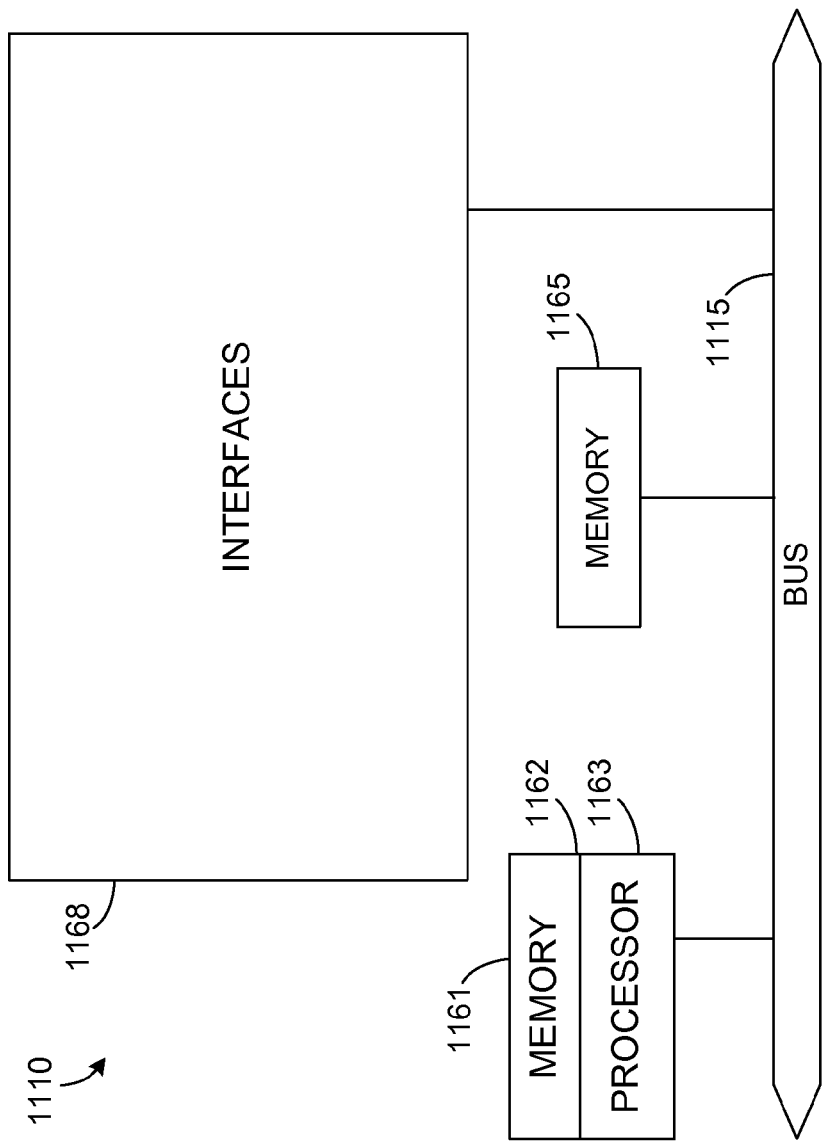
FIG. 9 is a diagrammatic representation of a router in which embodiments of the present invention may be implemented.

Referring now to FIG. 9, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, mapping tables etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, proxy registration and routing functions described herein. The program instructions may control the operation of an operating system and/or one or more applications, for example. The memory or memories may also be configured to store tables such as mobility binding, registration, routing and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed entities are merely illustrative, and therefore other entities or combinations thereof may be used to establish proxy registration on behalf of a node. In addition, while the disclosed embodiments support the querying of a Home Agent by a Gateway Router, other embodiments enable information such as a care-of address to be provided to the Gateway Router without requiring the Gateway Router to query the Home Agent. It is also important to note that, although the embodiments are described with reference to the Mobile IP protocol, other protocols may be used to implement a registration process as set forth in the above-described embodiments. As such, servers other than Home Agents may be used to initiate and control the registration process. Therefore, the described embodiments should be taken as illustrative and not restrictive, and the invention should not be limited to the details given herein but should be defined by the following claims and their full scope of equivalents.

What is claimed is:

1. An apparatus, comprising:
a processor; and
a memory, at least one of the processor or the memory being adapted for:
receiving a registration request identifying a node at a Home Agent from a first Local Mobility Anchor when the node moves into a region associated with the first Local Mobility Anchor, wherein the first Local Mobility Anchor is a regional controller via which registration is performed when the node moves within the region associated with the first Local Mobility Anchor such that the Home Agent does not receive registration requests identifying the node when the node moves within the region associated with the first Local Mobility Anchor, the registration request including a care-of address field identifying an IP address associated with the first Local Mobility Anchor; and
updating a mobility binding table at the Home Agent such that a binding between the node and the care-of address of the node is generated;
receiving a second registration request identifying the node at the Home Agent from a second Local Mobility Anchor when the node moves into a second region associated with the second Local Mobility Anchor and outside the first region associated with the first Local Mobility Anchor, wherein the second Local Mobility Anchor is a regional controller via which registration is performed when the node moves within the second region associated with the second Local Mobility Anchor such that the Home Agent does not receive registration requests identifying the node when the node moves within the second region associated with the second Local Mobility Anchor, the second registration request including a second care-of address field identifying an IP address associated with the second Local Mobility Anchor; and
updating the mobility binding table at the Home Agent such that a binding between the node and the second care-of address is generated.

2. The apparatus as recited in claim 1, at least one of the processor or the memory being further adapted for:
creating a routing table entry at the Home Agent such that packets are routed to the second Local Mobility Anchor when the node moves into the second region associated with the second Local Mobility Anchor.

3. An apparatus, comprising:
a processor; and
a memory, at least one of the processor or the memory being adapted for:
receiving by a Home Agent supporting Mobile IP a registration request identifying a node from a first Local Mobility Anchor, wherein the first Local Mobility Anchor is a regional controller via which registration is performed when the node moves within a region associated with the first Local Mobility Anchor such that subsequent registration requests identifying the node are not forwarded by the first Local Mobility Agent to the Home Agent or otherwise received by the Home Agent when the node moves within the region associated with the first Local Mobility Anchor; and
creating a mobility binding table entry at the Home Agent such that a binding between the node and a care-of address of the node specified in the registration request is generated, thereby enabling a Gateway Router at an edge of a service provider network to obtain the care-of address of the node from the Home Agent, wherein the Gateway Router is a router at an edge of a service provider network.

4. The apparatus as recited in claim 3, wherein a plurality of subnets associated with a plurality of nodes are configured on the Gateway Router.

5. An apparatus, comprising:
a processor; and
a memory, at least one of the processor or the memory being adapted for:
receiving by a first Local Mobility Anchor a registration request identifying a node via an access router, the first Local Mobility Anchor being a regional controller via which registration is performed when the node moves within a region associated with the first Local Mobility Anchor;
registering the node with a Home Agent supporting Mobile IP by the first Local Mobility Anchor when the node moves into the region associated with the first Local Mobility Anchor such that the Home Agent creates a routing table entry routing packets addressed to the node via the first Local Mobility Anchor, wherein the node is not registered with the Home Agent when the node moves within the region associated within the first Local Mobility Anchor;

creating by the first Local Mobility Anchor a routing table entry at the first Local Mobility Anchor such that packets addressed to the node are routed by the first Local Mobility Anchor to the access router;

receiving by the first Local Mobility Anchor a data packet at the first Local Mobility Anchor from a Gateway Router, the data packet being transmitted by a Correspondent Node; and forwarding the data packet from the first Local Mobility Anchor to the access router, thereby preventing the identity of the access router from being discovered by the Correspondent Node.

6. The apparatus recited in claim 5, wherein route optimization is achieved by eliminating the Home Agent from the data path.

7. The apparatus as recited in claim 5, at least one of the processor or the memory being further adapted for:

receiving a data packet from the node directed to the Correspondent Node;

identifying at the first Local Mobility Anchor a bi-directional tunnel between the first Local Mobility Anchor and the Gateway Router, the bi-directional tunnel corresponding to the node and the Correspondent Node; and forwarding the data packet received from the node via the bi-directional tunnel between the first Local Mobility Anchor and the Gateway Router.

8. The apparatus as recited in claim 5, further comprising:

receiving a second registration request identifying the node by the first Local Mobility Anchor from a second access router;

processing the second registration request at the first Local Mobility Anchor such that a bi-directional tunnel is established between the first Local Mobility Anchor and the second access router; and sending a registration reply from the first Local Mobility Anchor to the second access router, wherein the second registration request is not forwarded to the Home Agent.

9. The apparatus as recited in claim 8, at least one of the processor or the memory being further adapted for:

creating a routing table entry such that a routing path for the node is associated with the bi-directional tunnel.

10. The apparatus as recited in claim 8, wherein a transient bi-directional tunnel is generated between the first access router and the second access router, thereby enabling traffic in transit to be forwarded to the second access router by the first access router.

11. The apparatus as recited in claim 8, wherein data packets received by the first Local Mobility Anchor and addressed to the node are forwarded to the second access router.

12. An apparatus, comprising:

a processor; and a memory, at least one of the processor or the memory being adapted for:

receiving a packet by a Gateway Router from a Correspondent Node, the packet identifying a node;

transmitting by the Gateway Router a care-of address location request to a Home Agent associated with the node, the care-of address location request requesting a care-of address associated with the node;

receiving by the Gateway Router a response to the care-of address location request from the Home Agent, the response including a care-of address associated with the node and indicating a Local Mobility Anchor via which packets addressed to the node are to be tunneled, wherein the Local Mobility Anchor is a regional controller via which registration is performed when the node moves within a region associated with the Local Mobility Anchor; and tunneling the packet to the Local Mobility Anchor via the care-of address such that the Home Agent is eliminated from the data path.

13. The apparatus as recited in claim 12, at least one of the processor or the memory being further adapted for:

receiving a notification message from the Local Mobility Anchor that the node has moved to a region associated with a second Local Mobility Anchor.

14. The apparatus as recited in claim 12, at least one of the processor or the memory being further adapted for:

receiving a notification message from a first Local Mobility Anchor to clear its routing cache; and sending a request to the Home Agent for a care-of address of the node.

15. An apparatus, comprising:

a processor; and a memory, at least one of the processor or the memory being adapted for:

receiving a packet from a Correspondent Node by a Gateway Router, the packet being addressed to a node;

transmitting a care-of address location request by the Gateway Router to a Home Agent associated with the node, the care-of address location request requesting a care-of address associated with the node; and receiving by the Gateway Router a response to the care-of address location request from the Home Agent, the response including a care-of address associated with the node and indicating a first Local Mobility Anchor via which packets addressed to the node are to be tunneled; and receiving a notification message by the Gateway Router from the first Local Mobility Anchor that the node has moved to a region associated with a second Local Mobility Anchor.

16. An apparatus, comprising:

a processor; and a memory, at least one of the processor or the memory being adapted for:

registering a node with a Home Agent supporting Mobile IP by a first Local Mobility Anchor such that the Home Agent creates a routing table entry routing packets addressed to the node via the first Local Mobility Anchor, the first Local Mobility Anchor being a regional controller via which registration is performed when the node moves within a region associated with the first Local Mobility Anchor such that the node is not registered with the Home Agent when the node moves within the region associated with the first Local Mobility Anchor;

receiving by the first Local Mobility Anchor a notification from the Home Agent or a second Local Mobility Anchor indicating that the node has moved to a region associated with the second Local Mobility Anchor, the second Local Mobility Anchor being a regional controller via which registration is performed when the node moves within a region associated with the second Local Mobility Anchor such that the node is not registered with the Home Agent when the node moves within the region associated with the second Local Mobility Anchor; and creating a routing table entry at the first Local Mobility Anchor such that packets addressed to the node are routed by the first Local Mobility Anchor to the second Local Mobility Anchor.

17. The apparatus as recited in claim 16, at least one of the processor or the memory being further adapted for:
generating a tunnel between the first Local Mobility Anchor and the second Local Mobility Anchor.

18. The apparatus as recited in claim 17, wherein generating a tunnel between the first Local Mobility Anchor and the second Local Mobility Anchor is performed in response to the notification.

19. The apparatus as recited in claim 17, at least one of the processor or the memory being further adapted for:
wherein data packets addressed to the node that have already been routed to the first Local Mobility Anchor are routed to the second Local Mobility Anchor via the tunnel between the first Local Mobility Anchor and the second Local Mobility Anchor.

20. The apparatus as recited in claim 16, at least one of the processor or the memory being further adapted for:
routing packets addressed to the node to the second Local Mobility Anchor.

21. The apparatus as recited in claim 16, wherein the notification is received from the second Local Mobility Anchor.

22. The apparatus as recited in claim 16, wherein the notification is received from the Home Agent.

23. The apparatus as recited in claim 16, at least one of the processor or the memory being further adapted for:
receiving a data packet at the first Local Mobility Anchor from a Gateway Router when a Correspondent Node sends a data packet addressed to the node;
sending a binding update from the first Local Mobility Anchor to the Gateway Router, the binding update indicating that data packets addressed to the node are to be transmitted to the second Local Mobility Anchor instead of the first Local Mobility Anchor; and
routing data packets addressed to the node from the first Local Mobility Anchor to the second Local Mobility Anchor until route optimization has been established such that a bi-directional tunnel between the Gateway Router and the second Local Mobility Anchor is established.

24. The apparatus as recited in claim 16, at least one of the processor or the memory being further adapted for:
receiving a registration request identifying the node at the first Local Mobility Anchor via an access router when the node moves within the region associated with the first Local Mobility Anchor, thereby enabling the first Local Mobility Anchor to process the registration request without forwarding the registration request to the Home Agent; and
creating a routing table entry at the first Local Mobility Anchor such that a tunnel between the access router and the first Local Mobility Anchor is generated.

25. The apparatus as recited in claim 16, at least one of the processor or the memory being further adapted for:
when a data packet addressed to the node is received at the first Local Mobility Anchor from a Gateway Router, notifying the Gateway Router that the node has moved to the region associated with the second Local Mobility Anchor.

26. The apparatus as recited in claim 25, wherein data packets addressed to the node that are subsequently forwarded by the Gateway Router will be routed via the second Local Mobility Anchor, and data packets in transit will continue to be routed via the first Local Mobility Anchor.

27. The apparatus as recited in claim 26, wherein the data packets in transit are routed via a tunnel between the first Local Mobility Anchor and the second Local Mobility Anchor.

28. The apparatus as recited in claim 25, at least one of the processor or the memory being further adapted for:
routing packets addressed to the node to the second Local Mobility Anchor.

29. The apparatus as recited in claim 16, at least one of the processor or the memory being further adapted for:
receiving a registration request identifying the node via an access router by the first Local Mobility Anchor.

30. The apparatus as recited in claim 29, at least one of the processor or the memory being further adapted for:
receiving a data packet at the first Local Mobility Anchor; and
forwarding the data packet from the first Local Mobility Anchor to the access router, thereby preventing the identity of the access router to be discovered.

31. The apparatus as recited in claim 30, wherein route optimization is achieved by eliminating the Home Agent from the data path.

32. The apparatus as recited in claim 29, wherein the registration request has a care-of address field including an IP address associated with the first Local Mobility Anchor or the access router.

33. The apparatus as recited in claim 16, wherein the first Local Mobility Anchor acts as a Home Agent for the node when the node moves within the region associated with the first Local Mobility Anchor such that subsequent registration requests are not sent or forwarded to the Home Agent when the node moves within the region associated with the first Local Mobility Anchor.

34. An apparatus, comprising:
a processor; and
a memory, at least one of the processor or the memory being adapted for:
transmitting a first registration request identifying a node to a server via a first Local Mobility Anchor, wherein the first Local Mobility Anchor is a regional controller via which registration is performed when the node moves within a region associated with the first Local Mobility Anchor;
transmitting a second registration request identifying the node to the first Local Mobility Anchor when the node moves within the region associated with the first Local Mobility Anchor, wherein the second registration request is not transmitted to the server via the first Local Mobility Anchor when the node moves within the region associated with the first Local Mobility Anchor, and wherein the node does not register with the server when the node moves within the region associated with the first Local Mobility Anchor; and
transmitting a third registration request identifying the node to the server via a second Local Mobility Anchor when the node moves into a second region associated with the second Local Mobility Anchor and outside the first region associated with the first Local Mobility Anchor, wherein the second Local Mobility Anchor is a regional controller via which registration is performed when the node moves within the region associated with the second Local Mobility Anchor such that the node is not registered with the server when the node moves within the region associated with the second Local Mobility Anchor, wherein the server is a Home Agent supporting Mobile IP.

* * * * *